June 20, 1933.  A. D. GARDNER  1,914,498
PUMP
Filed March 20, 1929
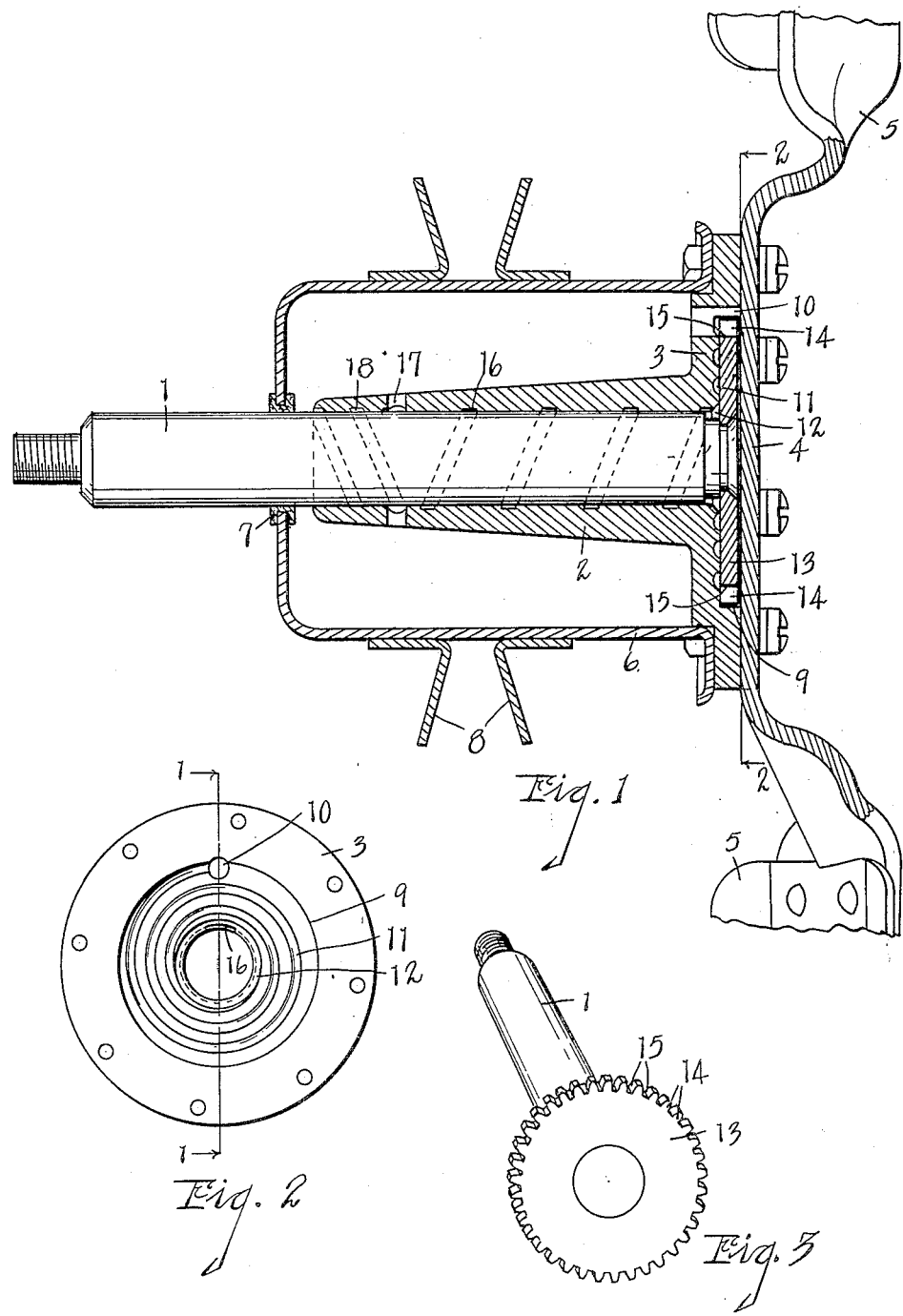
INVENTOR
Archibald D. Gardner
BY Chappell & Earl
ATTORNEYS Patented June 20, 1933

1,914,498

UNITED STATES PATENT OFFICE

ARCHIBALD D. GARDNER, OF JACKSON, MICHIGAN, ASSIGNOR TO AUTOMOTIVE FAN & BEARING COMPANY, OF JACKSON, MICHIGAN

PUMP

Application filed March 20, 1929. Serial No. 348,386.

The main objects of this invention are:

First, to provide a pump which is well adapted as a lubricant feed means for bearings and is readily adapted to various types of structures provided with bearings.

Second, to provide a pump of substantial capacity which is very simple and economical in its parts.

Objects relating to details and economies of my invention will appear from the detailed description to follow. The invention is defined and pointed out in the claims.

A structure which is a preferred embodiment of my invention is illustrated in the accompanying drawing, forming a part of this application, in which:

Fig. 1 is a fragmentary view mainly in section on line 1—1 of Fig. 2 of an automobile cooling fan embodying the features of my invention.

Fig. 2 is an end view of the outer pump member on a line corresponding to line 2—2 of Fig. 1.

Fig. 3 is a perspective view of the spindle and the inner pump member.

In the embodiment illustrated in the accompanying drawing, the spindle 1 is adapted to be mounted on an internal combustion engine or other suitable support.

The bearing 2 is provided with a flange-like head 3 to which the plate 4 is secured, this plate carrying the fan blades 5. A housing 6 adapted as a lubricant reservoir is secured to the head 3 and is provided with an opening through which the spindle projects, the opening being provided with a suitable packing indicated at 7. The housing is provided with pulley flanges 8.

The head 3 constitutes the outer member of the pump and has a cylindrical chamber 9 therein, the plate 4 constituting the outer wall of this chamber. The inlet passage 10 connects this chamber with the lubricant reservoir, this passage or inlet opening at the periphery of the chamber.

The inner face of the chamber is provided with a spiral groove 11 leading from the inlet 10 to the bearing, the end of the bearing being preferably beveled or slightly enlarged at 12. This groove constitutes a lubricant passage. Within this chamber, I mount a relatively stationary member 13 having tooth-like serrations 14 providing a plurality of peripheral pockets 15, these pockets being successively brought into register with the inlet 10 as the outer or impeller member of the pump rotates, with the result that the lubricant is drawn from the lubricant reservoir and delivered to the bearing. As each pocket passes the inlet it delivers oil to the inlet end of groove 11 causing a continuous and steady flow of oil along the groove.

The bearing is preferably provided with helical lubricant distributing grooves 16 which also serve as a pump; that is, the lubricant is sucked along by these grooves to the radial discharge openings 17 in the bearing which is preferably spaced from the end thereof, a spiral groove 18 having a reverse lead from that of the grooves 16 being arranged at the outside of these discharge openings 17 so that there is no tendency to force the lubricant through the packing 7.

My improved pump is very compact and simple and is effective in maintaining thorough lubrication of the bearing. While it is especially designed by me and I have illustrated it as a means for lubricating bearings, the pump is readily adapted for other purposes.

Having thus described my invention, what I claim as new and desire to secure by Letters Patent, is:

1. The combination of a spindle, a rotatable member provided with a bearing rotatable on said spindle, said rotating member being provided with a lubricant reservoir enclosing said bearing, said bearing being provided with a flange-like head member having a cylindrical chamber therein and a peripheral inlet opening from said chamber to the lubricant reservoir, the inner wall of the head member chamber having a spiral groove therein leading from said inlet to the spindle, and a gear-like pocket member arranged on said spindle within said chamber in contact with said groove with its teeth in the plane of said inlet opening.

2. The combination of a spindle, a rotatable bearing member on said spindle, a lubricant reservoir carried by said bearing member and enclosing the bearing member, a lubricant circulating pump comprising a chambered member on said bearing member having an inlet opening at its periphery to said lubricant reservoir and a spiral groove leading from said inlet opening to the bearing, and a peripherally toothed disc arranged in said chambered member in contact with said groove and mounted on said spindle so that the said inlet opening is successively brought into register with the pockets between the teeth.

3. The combination of a spindle, a rotatable bearing member on said spindle, a lubricant reservoir, a lubricant circulating means comprising a chambered outer pump member carried by said bearing and rotatable therewith and having a peripheral inlet opening to said lubricant reservoir and a spiral groove leading from said inlet opening to the bearing, the bearing member having a helical groove therein in communication with the inner end of the spiral groove in said pump member, and an inner pump member mounted on said spindle within said outer pump member and having an annular series of pockets successively registering with the said inlet of the outer member as it rotates.

4. The combination of a spindle, a rotatable bearing member on said spindle, a lubricant reservoir, a lubricant circulating means comprising a chambered outer pump member carried by said bearing and rotatable therewith and having a peripheral inlet opening to said lubricant reservoir and a spiral groove leading from said inlet opening to the bearing, and an inner pump member mounted on said spindle within said outer pump member and having an annular series of pockets successively registering with the said inlet of the outer member as it rotates.

5. The combination of relatively fixed and rotating bearing members, a lubricant reservoir enclosing said members, a chambered impeller rotating with the rotating member, there being an inlet from said lubricant reservoir to said chambered impeller opening at the periphery thereof, the side wall of said chambered impeller having a spiral groove, and a coacting non-rotating pocket member arranged within said impeller provided with pockets successively registering with said inlet opening as the impeller rotates.

6. A pump comprising an outer rotating chambered member having an inlet at its periphery and a central discharge and a spiral groove leading from said inlet to said discharge, and a toothed inner non-rotating member providing a plurality of pockets disposed so that the inlet opening is successively brought to register therewith.

In witness whereof I have hereunto set my hand.

ARCHIBALD D. GARDNER.